June 24, 1958     R. RUBENSTEIN ET AL     2,840,682
VAPORIZER
Filed Oct. 15, 1956
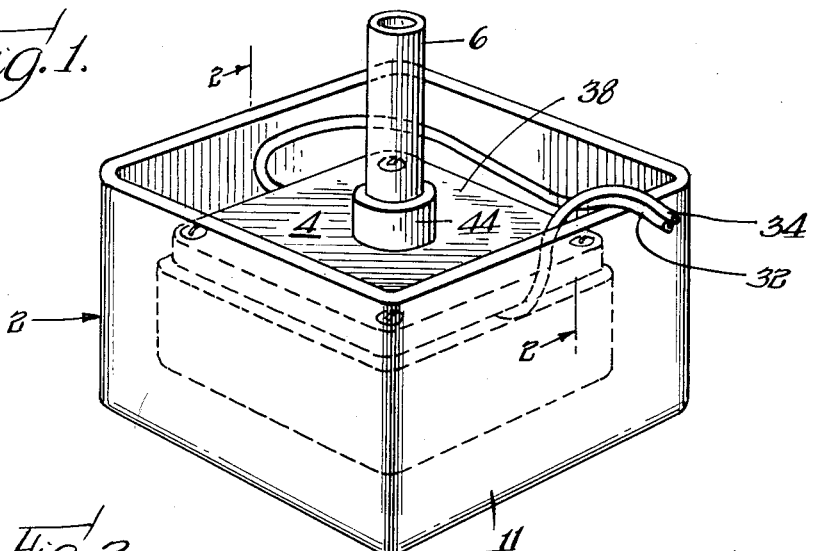
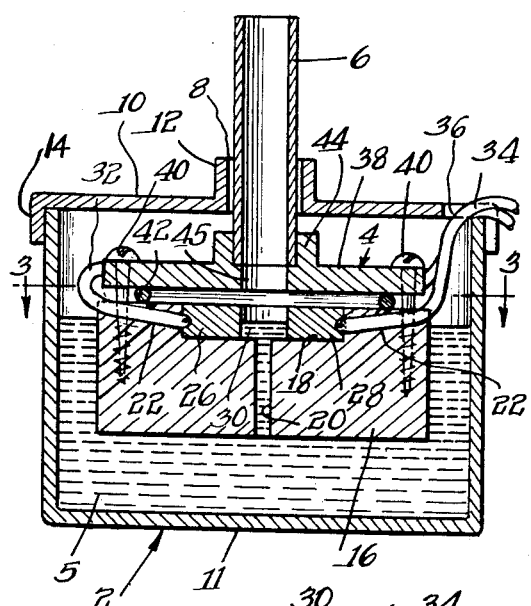
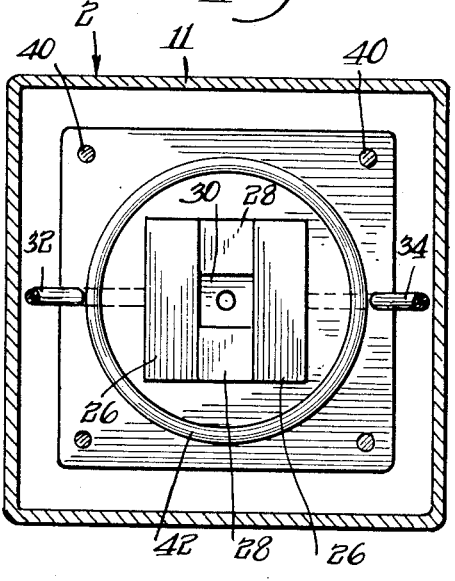
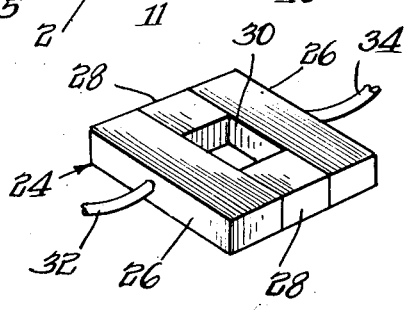
INVENTORS.
Robert Rubenstein
Sydney Weisberg
By: Wallenstein & Spangenberg
Attys.

United States Patent Office 2,840,682
Patented June 24, 1958

2,840,682
VAPORIZER

Robert Rubenstein and Sydney Weisberg, Chicago, Ill.

Application October 15, 1956, Serial No. 615,824

7 Claims. (Cl. 219—40)

This invention relates to vaporizers, particularly to water vaporizers for home use. More specifically, the invention relates to a type of water vaporizer which has the capacity to store appreciable amounts of water and yet in the vaporizing process only a relatively small amount of water is heated to provide a highly efficient and instant-acting vaporizer.

Among the principal objects of this invention are: to provide a vaporizer of the type above mentioned wherein the limited quantity of water being heated at any given time is substantially constant irrespective of the level of the main body of water carried in the vaporizer; to provide such a vaporizer which can be quickly and easily assembled and wherein most of the parts making up most of the vaporizer may be inexpensively made; to provide a vaporizer having an automatic shut-off feature which is operative when the water available for vaporizing is used up to prevent wastage of power and overheating; and to provide a vaporizer having the aforementioned characteristics which is not likely to break or otherwise go out of order.

Briefly, in accordance with a broader aspect of the invention, the vaporizer includes a container body having therein a float assembly which has formed therein a water-heating space of small dimensions relative to the water-containing space within the container body. A water-feed passage is provided in the float assembly which passage extends between the bottom portion of said water-heating space and the outside of the float assembly. The float carries water-heating means which preferably comprises a pair of electrodes which are spaced within said water-heating space. When the water within the water-heating space is rendered highly conductive by the addition of a suitable electrolyte-forming chemical and a source of voltage is applied to the electrodes, the limited quantity of water within said water-heating space will be heated to its boiling point. A vapor-discharge conduit communicating with the water-heating space carries the vapor to the outside of the vaporizer. Since the water-heating space is formed within the float assembly, the quantity of water in this space remains substantially constant as the float assembly drops with the level of water in the container body. The optimum or desired rate of vaporization may therefore be obtained at all times until the float assembly comes to rest on the bottom of the container. Then, as soon as all of the water in the water-heating space is vaporized, the flow of current through the vaporizer automatically ceases, thereby preventing wastage of power and overheating once the water which is available for vaporization is used up.

In accordance with a specific aspect of the invention, the float assembly comprises a body of buoyant material, such as wood or other similar material, which has in its upper face a recess into which a complementary shaped electrode-assembly is mounted. This assembly preferably comprises a pair of conductive electrodes separated by a pair of spaced insulating members. The electrodes and the insulating members together define a water-heating space which overlies said aforementioned feed-passage. Electrical conductors extend outwardly from the electrodes and to the outside of the vaporizer container for connection to an external source of voltage. The float assembly has a cover which is drawn toward the body of buoyant material by suitable fastening means to compress a sealing ring encompassing the water-heating space. The aforementioned vapor-discharge conduit comprises a vertical tube which extends upward from and overlies an opening in the float assembly cover, the latter overlying the water-heating space. Preferably, said body of buoyant material supports the float assembly in the water so that the level of the water in said water-heating space will never overflow the space. The container has a cover with an opening which guides and receives the vapor-discharge tube. To initiate operation of the vaporizer, a salt tablet may be dropped into the discharge tube, the salt tablet thereby falling into the water-heating space of the float assembly. Connection of the above-mentioned electrical conductors to a source of external voltage will cause immediate heating of the water in the space between the aforementioned electrodes. This heating vaporizes the water which rises through the vapor-discharge tube. The water level in the water-heating space is kept constant to provide an even rate of vaporization until the body of buoyant material comes to rest upon the container bottom, as above mentioned. The vaporizer constructed in accordance with this invention may be economically fabricated, and will operate satisfactorily with repeated and prolonged use.

Other objects, advantages and features of the invention will become apparent upon making reference to the specification to follow taken in conjunction with the claims and drawings wherein:

Fig. 1 is a perspective view of a vaporizer constructed in accordance with the invention, with the cover of the vaporizer container removed;

Fig. 2 is a vertical transverse sectional view of the vaporizer of Fig. 1 with the cover in place on the vaporizer container, as taken along section 2—2 in Fig. 1;

Fig. 3 is a horizontal transverse sectional view of the vaporizer taken along section line 3—3 in Fig. 2; and Fig. 4 is a perspective view of the electrode assembly unit forming part of the vaporizer.

Reference should now be made to the drawings where like reference numerals indicate like elements throughout.

The vaporizer of the invention includes a housing or container 2, which may be of a transparent plastic material, and a float assembly 4 which normally floats upon the body of water 5 within the container 2. Extending upwardly from the float assembly is a vapor-discharge tube 6 which passes through an opening 8 formed in a cover 10 which covers the open top of the container body 11. The cover 10 has a central collar portion 12 which defines the opening 8, and a depending peripheral flange 14 which extends around the outside of the top of the container body 11.

The float assembly 4 comprises a body 16 of buoyant material, such as wood, having a square recess 18 formed in the upper surface thereof. A vertical feed-passage extends from the bottom of the body 16 to the center of the recess 18. A pair of conductor-receiving bores of passage 22—22 are formed in the buoyant body 16, the passages extending upwardly and outwardly from opposite sides of the recess 18 and opening on the upper face of the body 16.

Mounted within the recess 18 is an electrode assembly 24 comprising a pair of electrodes 26—26 made of carbon, metal or other suitable material and a pair of insulating blocks 28—28 made of a suitable insulating material which are adhesively or otherwise suitably secured to the electrodes 26—26. The assembly of the electrodes and insulating members have an exterior shape which is complementary to the shape of the recess 18 in the buoyant body 16 and when mounted therein is flush with the upper surface of the body 16. The electrodes and insulating members form a contiguous inner surface which define a water-heating space 30. When the electrode assembly is placed within the recess 18, the electrode assembly space 30 overlies the top of the feed-passage 20.

A pair of electrical insulated conductors 32—34 are secured in any suitable manner, as by soldering, to the outwardly facing sides of the electrodes 26—26. These conductors extend through the passages 22—22 in the buoyant body 16 and extend to the outside of the vaporizer housing through a slot 36 in the container cover 10.

The float assembly 4 also has a cover member 38 which is drawn toward the buoyant body 16 by screws 40 passing through the cover member 38 and threading into the body 16. Compressed between the cover member and body 16 is a resilient gasket ring 42 which encompasses the recessed upper portion of the body 16 and is located within the extremities of the conductor-receiving passages 22—22.

The cover member 38 has an integral collar portion 44 into which the bottom of the vapor-discharge tube 6 extends. The tube 6 may be secured to the cover in any suitable manner, as by shrink fitting the tube into the collar portion 44 or by press-fitting the same therein. The cover member 38 is provided with a central opening 45 which overlies and connects with the bore of the vapor-discharge tube 6 and overlies the water-heating space 30. The operation of the vaporizer just described is as follows: when the container body 11 is filled with water, and the float assembly is immersed in the water with the vapor-discharge tube 6 extending through the opening 8 in the container 10, a suitable electrolyte-forming material, such as a salt tablet, is inserted into the top of the vapor-discharge tube 6. The salt tablet falls down into the water-heating space 30 provided by the electrode assembly. The amount of buoyant material in the body 16 is such that when the float assembly is floating in a body of water, the amount of water displaced thereby will cause the water level in the water-heating space 30 to be below the top of the space 30, as shown in Fig. 2. When a source of voltage is connected to the conductors 32—34 a current will flow between the electrodes 26—26 through the small amount of water in the water-heating space 30. The dissolved salt tablet provides a conductive medium through which this current may pass. The flow of current through the water in the space 30 will heat the water and vaporize the same. The vapor will rise up through the tube 6 to the outside of the vaporizer container. The compressed gasket ring 42 prevents passage of moisture from between the cover member 38 and the body 16. Since this moisture seal is located within the outer ends of the conductor-receiving passages 22—22, the dense vapor will not reach the conductors 32—34.

As the water level in the container body 11 drops, the float assembly drops with it so that the amount of water in the water-heating space 30 remains constant thereby providing a constant rate of water vaporization. The float assembly is maintained in a vertical path of travel in the container body 11 by the defining walls of the cover opening 8 which guides the discharge tube 6 as the float assembly moves relative to the container.

When the bottom of the body of buoyant material 16 touches the bottom of the container body 11, as the water in the heating space 30 is vaporized the level of the water in the space will be lowered until the space is empty of water. Then, the flow of current in the conductors 32—34 will cease and wastage of power and overheating is avoided.

The vaporizer of the assembly above described is of exceedingly simple and economical construction, and can withstand rough handling without breakage.

It should be understood that numerous variations may be made of the preferred form of the invention above described without deviating from the broader aspects thereof.

We claim as our invention:

1. A vaporizer comprising: a container for holding a supply of liquid to be vaporized, and a float assembly in said container including a body of buoyant material having formed therein a liquid-heating recess in the upper surface thereof and a liquid-feed passage extending from the bottom portion of said recess to the outside of the body for carrying water from the main body of liquid in said container to said recess, heating means in said recess for heating the liquid therein, a cover member for said float assembly, said cover having an opening therein which communicates with said liquid-heating recess, compressible gasket means for forming a continuous vapor-tight seal between said cover and body of buoyant material around the liquid-heating recess, releasable means for bringing the cover and body of buoyant material together to compress said seal-forming means therebetween, and vapor discharging means carried on top of said float assembly cover above the opening thereof for carrying vapor formed in said liquid-heating recess to the outside of said container, said body of buoyant material buoying up the float assembly in the liquid which is to fill said container to the extent that the level of liquid in said liquid-heating recess never reaches the upper extremities thereof to overflow the recess, and there being sufficient vertical clearance in said container body between the float assembly and said container that the float assembly may readily follow the drop of liquid in the container as it is used up.

2. A vaporizer comprising: a container having an open-top container body for holding a supply of liquid to be vaporized and a cover for said container body having a vertical guide opening therein, and a float assembly in said container including a body of a non-conductive buoyant material having formed therein a recess in the upper surface thereof and a liquid-feed passage extending from the bottom portion of said recess to the outside of the body for carrying water from the main body of liquid in said container to said recess, heating means in said recess for heating liquid therein comprising an electrode assembly including a pair of conductive electrodes and electrical conductors extending from said electrodes, a cover member for said float assembly, said cover having an opening therein which communicates with said liquid-heating recess, and vapor discharging means carried on top of said float assembly cover above the opening thereof and extending through said guide opening of said container cover for carrying vapor formed in said liquid-heating recess and passing through said float assembly cover opening to the outside of said container, said body of buoyant material buoying up the float assembly in the liquid which is to fill said container body, and there being sufficient vertical clearance in said container body between the float assembly and said container that the float assembly may readily follow the drop of liquid in the container as it is used up.

3. A vaporizer comprising: a container having an open-top container body for holding a supply of liquid to be vaporized and a cover for said container body having a vertical guide opening therein, and a float assembly in said container including a body of a non-conductive buoyant material having formed therein a recess in the upper surface thereof and a liquid-feed passage extending from the bottom portion of said recess to the outside of the body for carrying water from the main body of liquid in said container to said recess, heating means in said recess for heating liquid therein comprising an electrode assembly including a pair of conductive electrodes separated by insulating material which, together with the electrodes, form a continuous inner surface defining a liquid heating space small relative to the volume of said container for heating the liquid to be vaporized, said space communicating with said liquid feed passage, and said electrodes and insulating members having bottom and side surfaces which engage and are complementary in shape to the bottom and side defining surfaces of said recess in said body of buoyant material, electrical conductors extending from said electrodes at points outside of the inner surfaces thereof and below the level in said heating space to which said liquid rises therein and passing through respective bores formed in said body of buoyant material and out the bore ends which are located at points above said level in said liquid heating space, said conductors then passing through openings in said container to make connection with an external source of voltage, a cover member for said float assembly, said cover having an opening therein which communicates with said liquid-heating recess, compressible gasket means forming a continuous vapor-tight seal between said cover and body of buoyant material around the recess and inside of the points at which said conductors leave the body of buoyant material, releasable means for bringing the cover and body of buoyant material together to compress said seal-forming means therebetween, and vapor discharging means carried on top of said float assembly cover above the opening thereof and extending through said guide opening of said container cover for carrying vapor formed in said liquid-heating space through said float assembly cover opening to the outside of said container, said body of buoyant material buoying up the float assembly in the liquid which is to fill said container body, and there being sufficient vertical clearance in said container body between the float assembly and said container that the float assembly may readily follow the drop of liquid in the container as it is used up.

4. Vaporizing apparatus comprising a float assembly for insertion in a container of water comprising a buoyant body having formed therein a liquid-heating recess and a liquid-feed passage extending from the bottom portion of said recess to the outside of the body for carrying water from the main body of liquid in said container to said recess, heating means in said recess comprising a pair of laterally spaced conductive electrodes separated by insulating members extending between the end portions of said electrodes and which, together with the electrodes, form a continuous inner surface defining the perimeter of a liquid-heating space for heating the liquid to be vaporized by passage of current through said liquid, said space communicating with said liquid feed passage, and said electrodes and insulating members having bottom and side surfaces which engage and are complementary in shape to the bottom and side defining surfaces of said recess in said body of buoyant material, electrical conductors extending from said electrodes, and vapor discharging means for carrying vapor formed in said liquid-heating recess to the outside of said container.

5. Vaporizing apparatus comprising: a float assembly for insertion in a container of water comprising a buoyant body having formed therein a liquid-heating recess and a liquid-feed passage extending from the bottom portion of said recess to the outside of the body for carrying water from the main body of liquid in said container to said recess, heating means in said recess comprising a pair of laterally spaced conductive electrodes separated by insulating members extending between the end portions of said electrodes and which, together with the electrodes, form a continuous inner surface defining the perimeter of a liquid-heating space for heating the liquid to be vaporized by passage of current through said liquid, said space communicating with said liquid feed passage, electrical conductors extending from said electrodes, and vapor discharging means for carrying vapor formed in said liquid-heating recess to the outside of said container.

6. A vaporizer comprising: a container having an open-top container body for holding a supply of liquid to be vaporized and a float assembly in said container including a body of non-conductive buoyant material having formed therein a recess forming a liquid heating space in the upper surface thereof and a liquid-feed passage extending from the bottom portion of said recess to the outside of the body for carrying water from the main body of liquid in said container to said recess, heating means in said recess for heating liquid therein comprising an electrode assembly including a pair of conductive electrodes which engage the side defining surfaces of said recess in said body of buoyant material, electrical conductors extending from said electrodes at points outside of the inner surfaces thereof and below the level in said heating space to which said liquid rises therein and passing through respective bores formed in said body of buoyant material and out the bore ends which are located at points above said level in said liquid heating space, said conductors then passing through openings in said container to make connection with an external source voltage, and vapor discharging means for carrying vapor formed in said liquid-heating space to the outside of said container, said body of buoyant material buoying up the float assembly in the liquid which is to fill said container body, and there being sufficient vertical clearance in said container body between the float assembly and said container that the float assembly may readily follow the drop of liquid in the container as it is used up.

7. A vaporizer comprising: a container having an open-top container body for holding a supply of liquid to be vaporized and a float assembly in said container including a body of a non-conductive buoyant material having formed therein a recess in the upper surface thereof and a liquid-feed passage extending from the bottom portion of said recess to the outside of the body for carrying water from the main body of liquid in said container to said recess, electrical heating means in said heating space for heating liquid therein and which engages the side defining surfaces of said recess in said body of buoyant material, electrical conductors extending from said electrodes at points outside of the inner surfaces thereof and below the level in said heating space to which said liquid rises therein and passing through respective bores formed in said body of buoyant material and out the bore ends which are located at points above said level in said liquid-heating space, said conductors then passing through openings in said container to make connection with an external source of voltage, a cover member for said float assembly, said cover having an opening therein which communicates with said liquid-heating recess, compressible gasket means forming a continuous vapor-tight seal between said cover and body of buoyant material around the recess and inside of the points at which said conductors leave the body of buoyant material, releasable means for bringing the cover and body of buoyant material together to compress said seal-forming means therebetween, and vapor discharging means carried on top of said float assembly cover above the opening thereof for carrying vapor formed in said liquid-heating recess through said float assembly cover opening to the outside of said container, said body of buoyant material buoying up the float assembly in the liquid which is to fill said container body, and there being sufficient vertical clearance in said container that the float assembly may readily follow the drop of liquid in the container as it is used up.

References Cited in the file of this patent

UNITED STATES PATENTS

| | | |
|---|---|---|
| 1,430,548 | Hogue | Oct. 3, 1922 |
| 1,909,973 | Lewis et al. | May 23, 1933 |
| 2,111,206 | Coe | Mar. 15, 1938 |
| 2,617,010 | Schmitz | Nov. 4, 1952 |